US007380651B2

(12) United States Patent
Lafontaine et al.

(10) Patent No.: US 7,380,651 B2
(45) Date of Patent: Jun. 3, 2008

(54) ORDER HANDLING SYSTEM

(76) Inventors: Dan Lafontaine, 370 Docteur Thauvette, Vaudreuil-Dorion, QBC (CA) J7V 6Z6; Howard Geniele, 5607 ave Hartwell, Cote St-Luc, QBC (CA) H4W 1T5

( * ) Notice: Subject to any disclaimer, the term of this patent is extended or adjusted under 35 U.S.C. 154(b) by 133 days.

(21) Appl. No.: 10/806,189

(22) Filed: Mar. 23, 2004

(65) Prior Publication Data
US 2004/0191050 A1    Sep. 30, 2004

Related U.S. Application Data

(60) Provisional application No. 60/456,573, filed on Mar. 24, 2003, provisional application No. 60/456,574, filed on Mar. 24, 2003.

(51) Int. Cl.
*B65G 37/00* (2006.01)
(52) U.S. Cl. .............. 198/580; 193/25 FT; 414/796.8; 414/796.4
(58) Field of Classification Search ............... 193/2 R, 193/4, 12, 25 FT, 27, 35 R; 414/796.2, 796.7, 414/796.3, 796.4, 796.8, 799, 928, 929, 801, 414/496.8; 198/465.1, 580
See application file for complete search history.

(56) References Cited

U.S. PATENT DOCUMENTS

| | | | | |
|---|---|---|---|---|
| 1,351,554 A * | 8/1920 | Cowley | ....................... | 193/36 |
| 1,694,019 A * | 12/1928 | Pfeiffer | ....................... | 193/12 |
| 1,800,898 A * | 4/1931 | Nelskn | ....................... | 198/451 |
| 1,908,722 A * | 5/1933 | Yeakel | ....................... | 193/2 R |
| 1,993,945 A * | 3/1935 | Peterson | ....................... | 193/12 |
| 2,118,195 A * | 5/1938 | Hague | ....................... | 193/35 R |
| 2,193,681 A * | 3/1940 | Werner | ....................... | 193/2 R |
| 2,399,087 A * | 4/1946 | Abbott | ....................... | 414/421 |
| 2,808,946 A | 10/1957 | Just et al. | | |
| 2,815,841 A * | 12/1957 | Dabich | ....................... | 193/25 FT |
| 2,948,375 A * | 8/1960 | Dabich | ....................... | 193/35 F |
| 3,002,600 A * | 10/1961 | Campbell | ....................... | 193/25 FT |
| 3,067,891 A * | 12/1962 | Anderson | ....................... | 414/414 |
| 3,343,793 A * | 9/1967 | Waser | ....................... | 238/10 R |
| 3,456,424 A * | 7/1969 | Thurston et al. | ....................... | 53/154 |
| 3,467,238 A | 9/1969 | Fry et al. | | |
| 3,891,080 A * | 6/1975 | Neises | ....................... | 198/531 |
| 4,021,992 A * | 5/1977 | Spaude et al. | ....................... | 53/399 |
| 4,411,350 A * | 10/1983 | Wolfram | ....................... | 193/35 A |
| 4,411,366 A * | 10/1983 | De Greef | ....................... | 209/648 |
| 5,018,073 A | 5/1991 | Goldberg | | |
| 5,215,421 A * | 6/1993 | Smith | ....................... | 414/276 |
| 5,361,889 A | 11/1994 | Howell et al. | | |
| 5,398,801 A * | 3/1995 | Langen et al. | ....................... | 198/407 |
| 5,638,938 A | 6/1997 | Lazzarotti et al. | | |
| 5,878,862 A * | 3/1999 | Dewsnap | ....................... | 193/27 |
| 5,934,864 A | 8/1999 | Lyon et al. | | |
| 6,089,819 A * | 7/2000 | Barnes | ....................... | 414/794.7 |
| 6,264,422 B1 * | 7/2001 | Hennes et al. | ....................... | 414/792.7 |

(Continued)

*Primary Examiner*—James R Bidwell
(74) *Attorney, Agent, or Firm*—Equinox Protection; Franz Bonsang, Patent Agent (57) ABSTRACT

An order merging system includes two first case guides with a pair of twisted lanes. The case guides are downwardly sloped and guide a product case along in each case guide. Two raisable guides are connected downstream of the case guides and are in communication with them. Two other case guides in communication with the raisable guides, which are lowered to allow the product cases from the first case guides to merge onto the other case guides.

21 Claims, 5 Drawing Sheets

U.S. PATENT DOCUMENTS

| | | |
|---|---|---|
| 6,349,814 B1 * | 2/2002 | Tarlton ........................ 198/407 |
| 6,425,226 B1 | 7/2002 | Kirschner |
| 6,640,953 B2 | 11/2003 | Brouwer et al. |
| 6,923,307 B2 * | 8/2005 | Haan et al. .............. 198/347.4 |
| 2002/0104736 A1 | 8/2002 | Peppel et al. |
| 2003/0138312 A1 | 7/2003 | Watson et al. |
| 2003/0176944 A1 | 9/2003 | Stingel, III et al. |

* cited by examiner

ORDER HANDLING SYSTEM

CROSS REFERENCE TO RELATED APPLICATIONS

Benefit of U.S. Provisional application, Serial No. 60/456,573, filed Mar. 24, 2003 and U.S. Provisional application, Serial No. 60/456,574, filed Mar. 24, 2003, are hereby claimed.

FIELD OF THE INVENTION

The present invention concerns order handling systems, more particularly to order handling systems for merging product cases.

BACKGROUND OF THE INVENTION

Distribution warehouses handle large volumes of products, which are often packed and palletized onto pallets on site. High volume manufacturers with a wide product range, such as those in the beverage industry, routinely ship orders after a customer has ordered a variety of specific products. Typically, systems that handle the products consist of pallets containing different assortments of shipping cases, palletizing and depalletizing stations and a series of conveyor belts interconnecting the system. While this type of system has worked well in the past, with the advent of more diversified products, they have become time-consuming and labor intensive. System designers are continuously looking for new technology to reduce the time, and manpower required preparing these orders.

Several order handling systems exist, a few examples of which are as follows:

- U.S. Pat. No. 6,640,953, issued Nov. 4, 2003, to Brouwer et al. for "Controlled Gravity Accumulation Conveyor";
- U.S. Pat. Application Publication No. 2003/0176944, published Sep. 18, 2003 to Stingel III et al. for "Automated Container Storage and Delivery System";
- U.S. Pat. Application Publication No. 2003/0138312, published Jul. 24, 2003 to Watson et al. for "Depalletizer for a Material Handling System";
- U.S. Pat. No. 6,425,226, issued Jul. 30, 2002, to Kirschner for "System and Method for Order Packing";
- U.S. Pat. No. 5,934,864, issued Aug. 10, 1999, to Lyon et al. for "Case Picking System";
- U.S. Pat. No. 5,361,889, issued Nov. 8, 1994 to Howell et al. for "Apparatus for Merging Multiple Lanes of Product";
- U.S. Pat. No. 5,018,073, issued May 21, 1991, to Goldberg for "High Density Loaded Sorting Conveyors"; and
- U.S. Pat. No. 2,808,946, issued Oct. 8, 1957, to Just el al. for "Warehouse Equipment".

The aforesaid designs suffer from a number of important drawbacks. Disadvantageously, many of the designs are complex and include many conveyor systems with multiple curves, which cover a large area thereby making inefficient use of a warehouse floor space. Moreover, the conveyor systems are often electrically powered, the use of which may be prohibitively expensive. Some systems appear to be designed specifically for conveying and mixing specific product types and include complex counting and dispensing mechanisms. In addition, the expense of operating the powered systems may be too high to yield sufficient payback when compared to a more manual method.

Thus, there is a need for an improved system for order handling.

SUMMARY OF THE INVENTION

The present invention reduces the difficulties and disadvantages of the previous designs by providing an integrated order picking and mixing system for a distribution warehouse, such as is common in the beverage industry:

The system prepares pallets of mixed products, as ordered by individual retail outlets. Sales orders data for the day is uploaded by a control unit, which schedules and dispatches the production of orders to different sub systems. The system is inexpensive to install and operate, is compact and makes efficient use of existing warehouse floor space. The system of the present invention advantageously substantially improves productivity and when compared to current manual order picking methods, decreases delivery response time after an order has been placed, and produces significantly fewer order errors. An ergonomically favourable semi-automated depalletizing station allows a human operator to efficiently depalletize a product-filled pallet onto a conveyor system, without having to stretch or bend over or lift from the pallet, thereby reducing back injury to the operator. Furthermore, a real-time product tracking system electronically monitors a product's position on the mixing conveyor. In addition, the automated palletizing system can be used to palletize layers containing products of different format and sizes. Incorporating a batching infeed to the palletizers allows a palletizer to increase throughput and reduce physical labor on the depalletizing stations. A just-in-time product replenishment system forecasts and communicates future product requirements to the forklift operators who maintain a supply of full pallets of product to the depalletizing stations. Moreover, a computer-based operating system interfaces with, and receives orders from, an existing database. Furthermore, the system allows the supervisor to configure the system for various Stock Keeping Units (SKUs). The system is able to calculate overall system and individual operator productivity and archive the data. Moreover, the system controls various mechanical sub-systems and directs the operators to ensure this required level of productivity.

In accordance with a first embodiment of the present invention, there is provided an order merging system, the system comprising: at least two depalletizing stations, each depalletizing station being dedicated to a different respective product unit depalletized thereon; for each depalletizing station, at least one pair of first case guides in communication therewith and having at least one pair of curved, twisted and downwardly sloping lanes for guiding at least one product case of the respective product unit for the depalletizing station therealong in each of the first case guides; for each pair of first case guides, at least one pair of lowerable guides connected downstream thereof of the first case guides and in respective communication therewith; at least one pair of independent mixing second case guides of a mixing conveyor for receiving mixed product cases thereon to feed the cases away from the at least two depalletizing stations and located downstream therefrom, each said lowerable guide being selectively in communication with a respective one of said second case guides, the lowerable guides being selectively lowerable to allow the product cases of the respective product unit for the depalletizing stations from each said first case guide to merge onto a respective said second case guide, each said depalletizing station being at a respective location along the mixing second case guides such that one of the at least two depalletizing stations is downstream of the other one relative to the mixing second case guides, each said lowerable guide allowing mixed product cases merged onto respective said second case guide from an upstream said depalletizing station to flow thereunder.

In accordance with another embodiment of the present invention, there is provided a depalletizing station assembly for use with a conveyor system, the assembly comprising: a conveyor end portion hingeably connected to one end of the conveyor system and in communication with a pallet having thereon a product case, the product case being received on the conveyor end portion from the pallet, the conveyor end portion being laterally movable relative to the conveyor system.

In accordance with another embodiment of the present invention, there is provided an order handling system, the system including: at least two depalletizing stations, each depalletizing station being dedicated to a different product unit; at least two accumulating conveyor systems in communication with the depalletizing stations, the accumulating conveyor system including a twisted sloped gravity conveyor having a pair of independent product accumulation lanes for receiving at least one case of the same product thereon; a pair of raisable guides connected downstream of the product accumulation lanes and in communication therewith; a mixing conveyor disposed between the depalletizing stations for feeding the cases away from the accumulation conveyor systems, the mixing conveyor being connected to the accumulating conveyor systems and located downstream therefrom, the mixing conveyor having at least two independent mixing lanes, the mixing lanes being continuous with the product accumulation lanes, the raisable guides being lowered to allow the product cases from the product accumulation lanes to merge onto the mixing lanes; at least two palletizing stations connected to the mixing conveyor.

BRIEF DESCRIPTION OF THE DRAWINGS

Further aspects and advantages of the present invention will become better understood with reference to the description in association with the following Figures, in which.

DETAILED DESCRIPTION OF THE PREFERRED EMBODIMENTS

Figure 1:
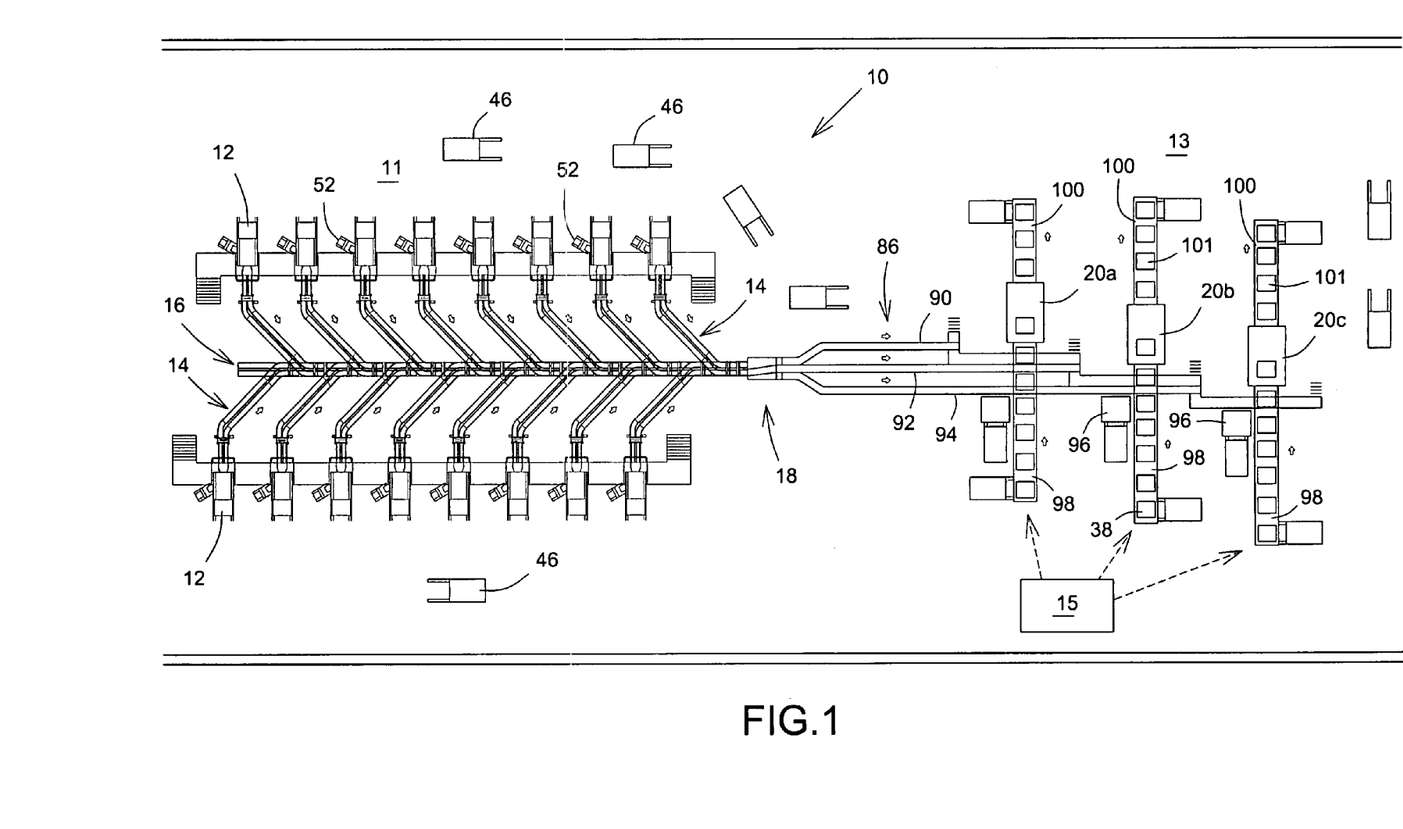
FIG. 1 is a simplified top plan view of an embodiment of an integrated order picking and mixing system.

Referring to FIG. 1, an integrated order handling/merging system for mixing and picking the order is shown generally at 10. Broadly speaking, the system 10 is divided into a mixing section 11, a picking section 13 and a batching section 15. The mixing section 11 includes at least two semi-automated depalletizing stations 12, each with an accumulating conveyor system 14, a mixing conveyor 16 and a case switch 18. At the picking section 13, an operator takes a pallet of products from the discharge of one of the palletizing stations 20 and completes the order by manually picking and palletizing products. The palletizing stations 20 are in communication with the batching section 15. In the embodiment illustrated, each depalletizing station 12 is dedicated to handle a different specific product unit known as a stock-keeping unit (SKU), which includes a case of bottled or canned beverages of the same type. The system 10 is able to differentiate between three classes of product handling: (i) high mover product, which accounts for a large amount of volume; (ii) normal mover product, which accounts for a moderate amount of volume; and (iii) slow mover product, which accounts for a low amount of volume. The system 10, as illustrated, includes sixteen depalletizing stations 12, which include ten high mover product stations and six normal mover product stations. One skilled in the art will understand that although sixteen depalletizing stations 12 are illustrated in this embodiment, any number of at least two depalletizing stations may be used without deviating from the scope of the present invention.

As best illustrated in FIGS. 1, 2, 3 and 4, the depalletizing stations 12 are each connected via their corresponding accumulating conveyor systems 14 to the mixing conveyor 16, which is common to all the depalletizing stations 12. Since the depalletizing stations 12 are essentially identical, only one will be described in detail as follows.

The depalletizing station 12 is an assembly, which includes a main support frame 22 with four legs 24 that supports a mezzanine level 26. Extending away from the main frame 22 towards the accumulating conveyor system 14 is a T-bar 28 that is connected to a conveyor support 30 on which is mounted the ends of the accumulating conveyor system 14. A safety barrier 32 is connected to an edge 34 of the mezzanine level 26. A lift access opening 36 is located in the mezzanine level 26 and is sized to receive therethrough a pallet 38 having thereon a product 40. Surrounding the lift access opening 36 is another support frame 42, which is connected to a pallet hold/empty pallet eject mechanism 44. One of a number of forklift trucks 46 loads a number of full pallets 48 of the product 40 onto a pallet in-feed conveyor 50. In the embodiment illustrated, the products 40 are cardboard boxes or cases of beverage product. Once the product 40 has been automatically moved into position, a stationary lift 52 raises the full pallet 48 to the mezzanine level 26.

Figure 2:
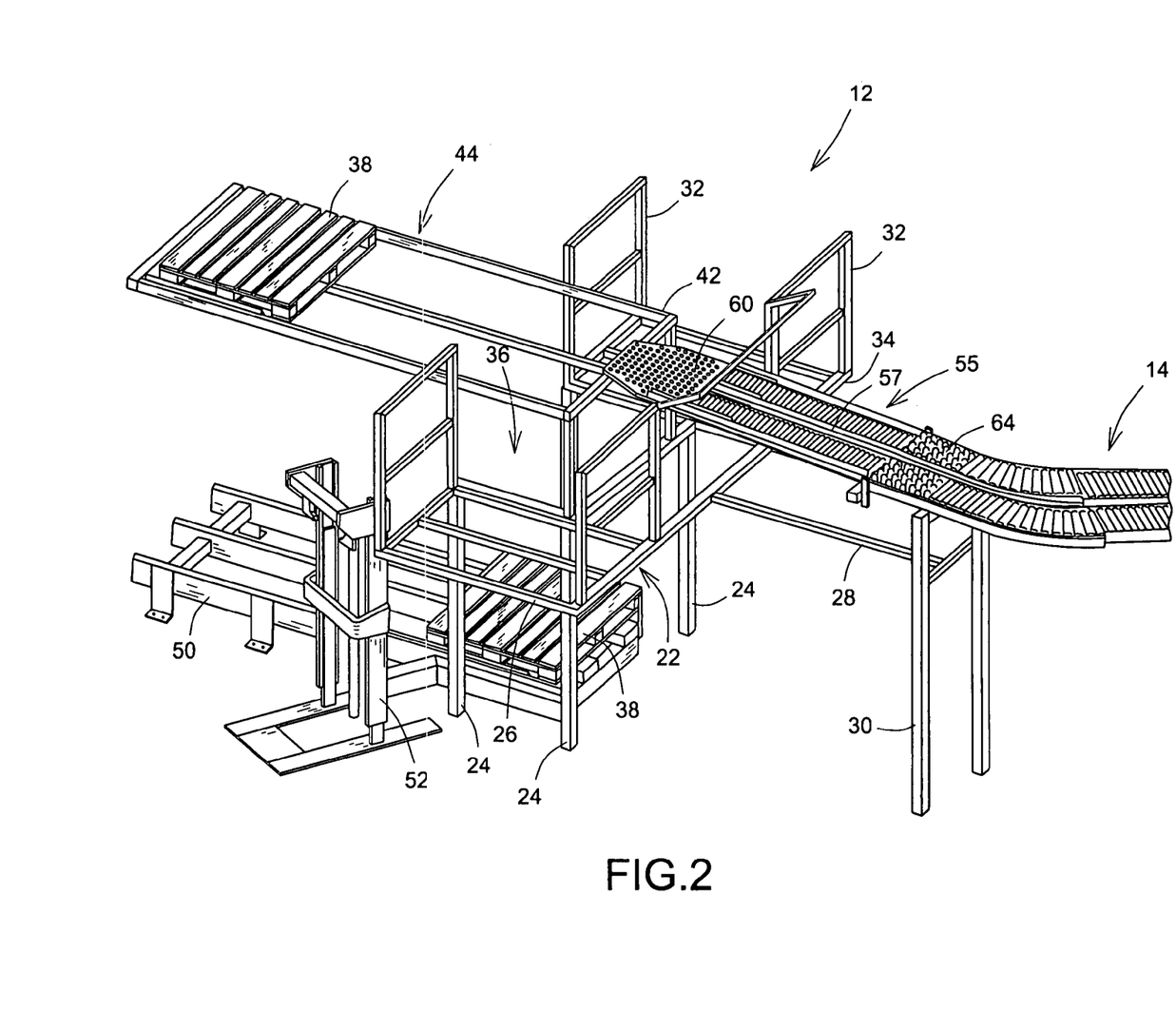
FIG. 2 is a simplified perspective view of a depalletizing station with cases of product removed for clarity.
Figure 3:
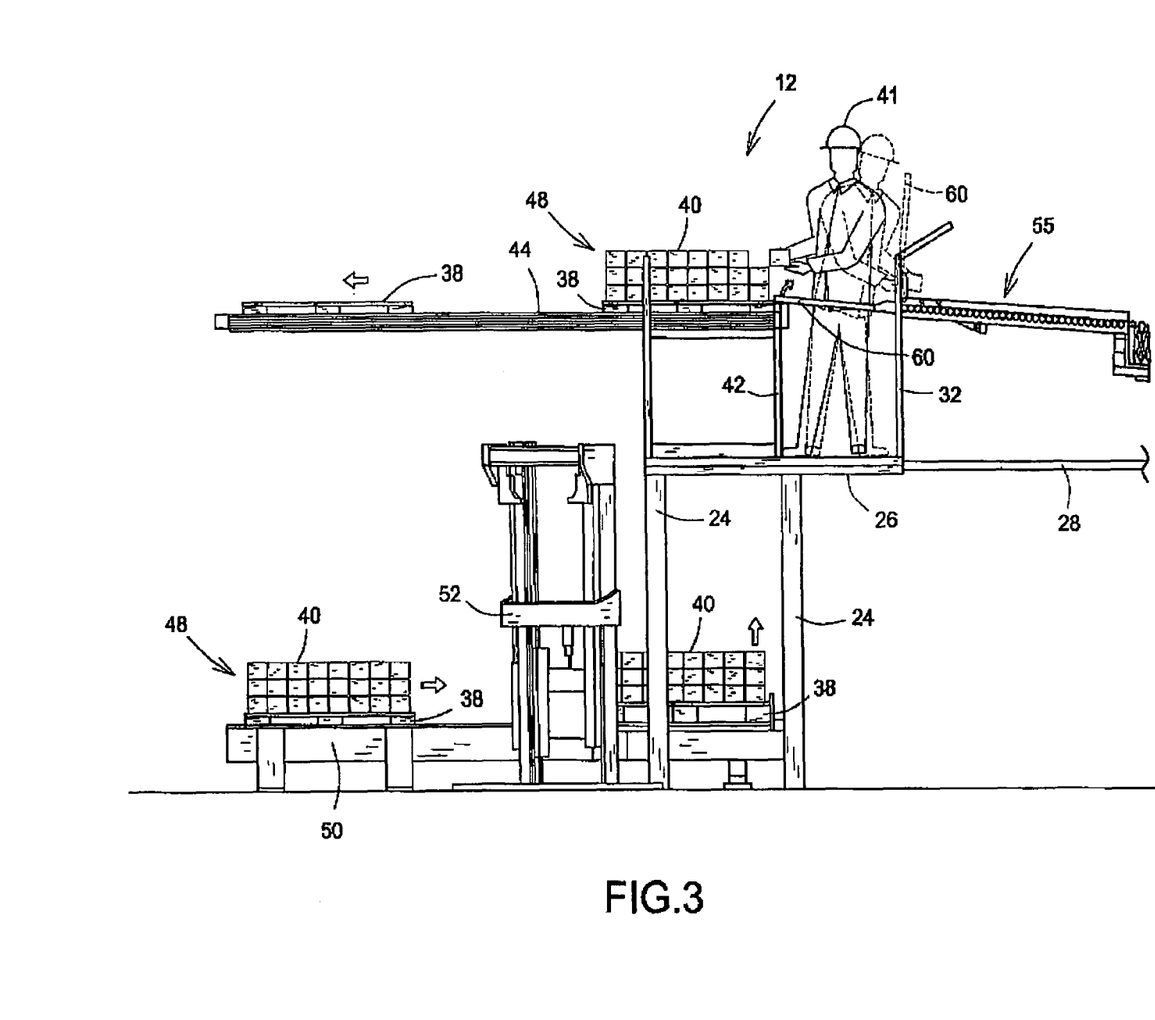
FIG. 3 is a side view of the depalletizing station.
Figure 4:
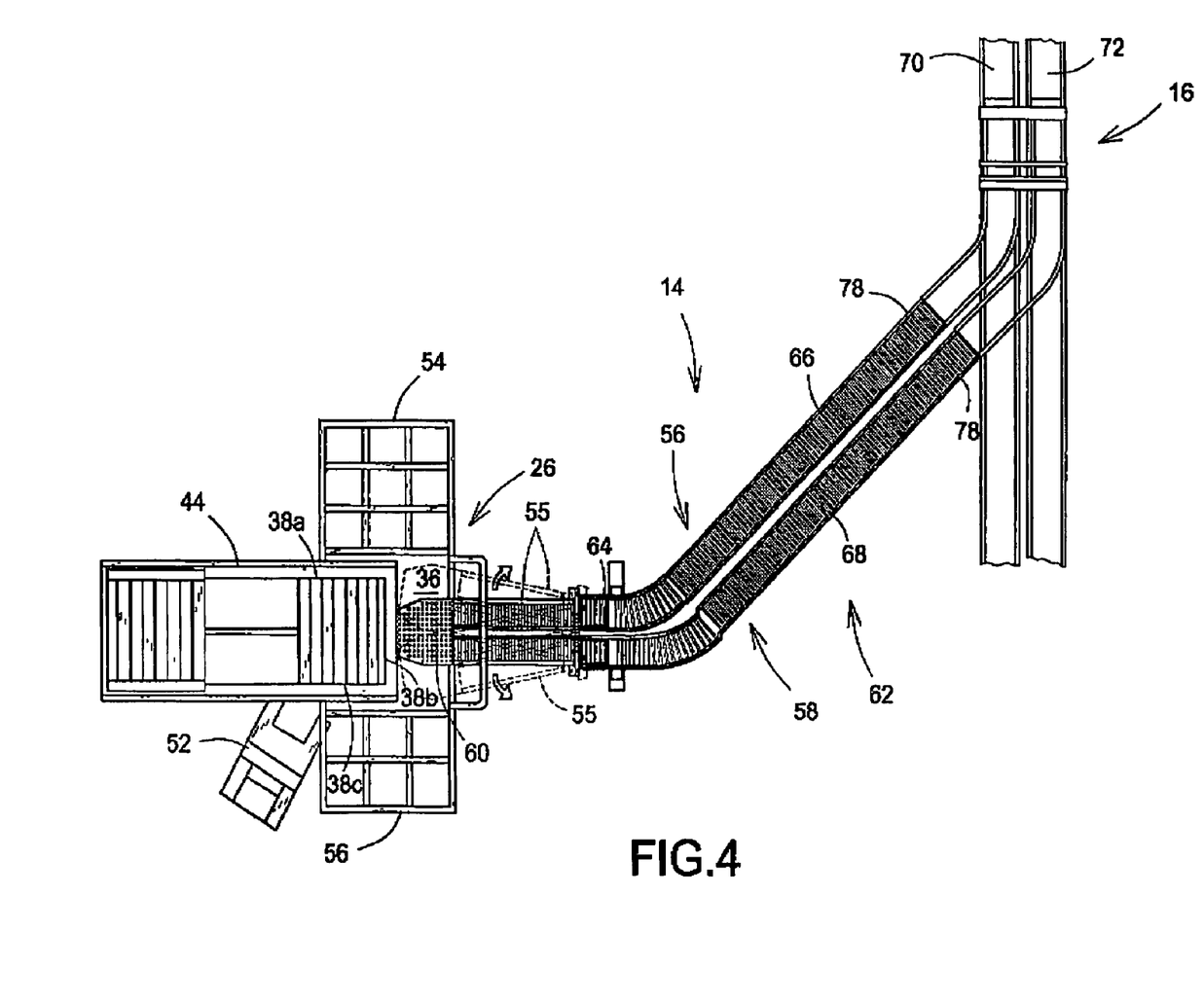
FIG. 4 is a simplified top plan view of the depalletizing station showing a pivoting conveyor.

As best illustrated in FIGS. 2, 3 and 4, the mezzanine level 26 is at a predetermined height to allow an operator 41 standing on the mezzanine level 26 to have easy and ergonomically favored access to a top layer of the boxes 40 on the pallet 38. The mezzanine level 26 includes two extensions 54, 56 located on either side of the lift access opening 36. An alert system (not shown) communicates to the operator 41 to maintain the accumulating conveyor system 14 full of boxes 40, by removing the boxes 40 from the pallet 38 (so-called depalletizing) and replenishing the conveyor system 14. After removing the last product 40 from the top layer, the operator requests the lift 52 to raise and present the next layer of products 40 at the ergonomic depalletizing height. When the last layer of boxes 40 arrives at the depalletizing height, the pallet hold/empty pallet eject mechanism 44 maintains the pallet 38 containing one layer of boxes 40 in position while the stationary lift 52 returns to the lowered position. In this lowered position, the lift 25 is ready to accept the next full pallet of boxes 40, which advances automatically on the pallet in-feed conveyor 50. The empty pallet 38 is then ejected away from the depalletizing station using the pallet hold/empty pallet eject mechanism 44.

Figure 5:
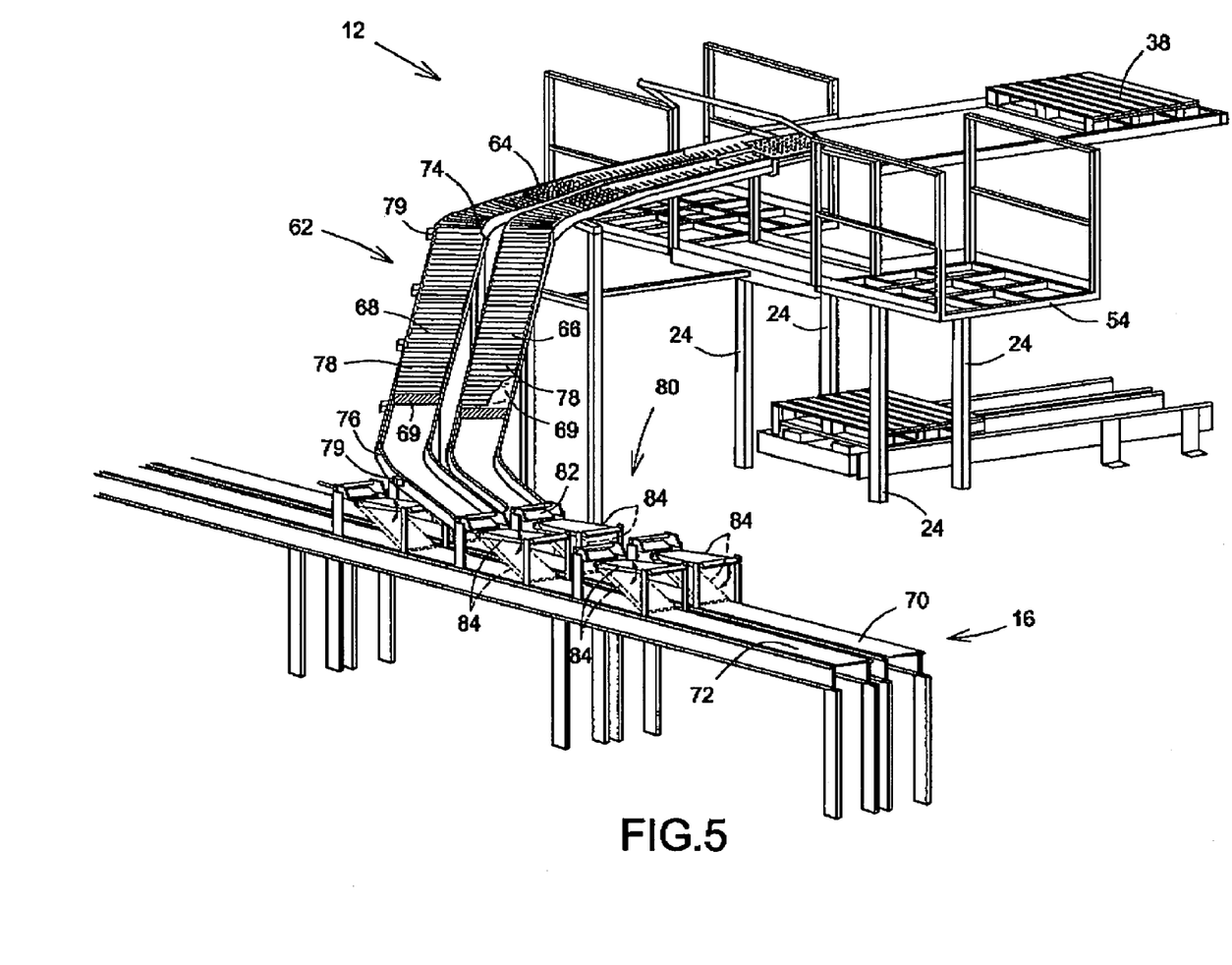
FIG. 5 is simplified perspective view of the depalletizing station showing a sloped gravity conveyor.

Referring to FIGS. 3, 4 and 5, the operator 41 transfers boxes 40 from the pallet 38 and places them onto the accumulating conveyor system 14, which is connected to and in communication with the mixing conveyor 16. The accumulating conveyor system 14 includes a conveyor end portion, which is typically a hingeable conveyor 55, a flip up bridge 60, a downwardly sloped gravity conveyor 62, and a flexible joint 64, which houses the hinge for the assembly. The accumulating conveyor system 14 includes at least two, independent and generally parallel first case guides 56, 58, which run from the hingeable conveyor 55 to the mixing conveyor 16 via the sloped gravity conveyor 62. Each of the first case guides 56, 58 separately guides at least two boxes 40 therealong towards the mixing conveyor 16. The first case guides 56, 58 are integral with the hingeable conveyor 55 and the flexible joint 64, each of the guides 56, 58 being separated by a central disposed barrier 57. After the hingeable conveyor 55, the first case guides 56, 58 separate into two independent and parallel product accumulation conveyors or lanes 66, 68, which form part of the sloped gravity conveyor 62. The product accumulation lanes 66, 68 are typically roller conveyors. The flip up bridge 60 is a ball table and allows the easy alignment of boxes 40 into each of the case guides 56, 58 by the operator 41. The bridge 60 is designed as a tilting counterbalanced bridge so that it can be flipped up out of the way when the operator 41 moves away. The hingeable conveyor 55 is hingeably connected to the sloped gravity conveyor 62 through the flexible joint 64, which can extend towards the boxes 40 on the pallet 38 and allows the operator 41 to place the flip up bridge 60 very close to the boxes 40 to avoid lifting of the boxes. The flexible joint 64 also allows the hingeable conveyor 54 to move laterally relative to the sloped gravity conveyor 62, as illustrated by the arrows in FIG. 4. The hinging lateral movement allows access of the operator 41 to slide cases onto the flip up bridge 60 from any location at the front of the pallet 38. Moreover, the flip up bridge 60 can be hinged upwardly and away from the pallet 38 to allow the operator 41 to move around the front of the pallet, thereby giving him access to all three sides 38a, 38b, 38c of the pallet 38 so that the boxes 40 from the top of the pallet 38 can be removed in an ergonomically favorable maneuver. The flip up bridge 60 is hingeably connected to the end of the hingeable conveyor 55 and temporarily rests on a portion of the support frame 42. The hingeable conveyor 55 and the flexible joint 64 are typically inclined downwardly away from the main support frame 22 and towards the sloped gravity conveyor 62.

As best illustrated in FIGS. 4 and 5, the sloped gravity conveyor 62 slopes downwardly away from the main support frame 22 towards the mixing conveyor 16. The mixing conveyor 16 includes at least two, independent and generally parallel second case guides 70, 72 in the form of two conveyors or lanes, which are continuous with two independent and parallel product accumulation lanes 66, 68 of the sloped gravity conveyor 62 and serve to double the total product throughput compared to only one mixing belt. The two case guides 70, 72 separately convey the two separate cases from the accumulation lanes 66, 68 towards the palletizing stations 20. Selected products from the depalletizing station 12 are fed onto the sloped gravity conveyor 62, which allows the selected products to be metered and merged with other selected products from other depalletizing stations 12 on demand into the second case guides 70, 72. The two case guides 70, 72 are typically separate mixing conveyors, which may be belts or rollers. One skilled in the art will recognize that although two first case guides and two second case guides are illustrated, additional first and second case guides could be added to the accumulating conveyor system 14 without deviating from the scope of the present invention.

Due to a high rate of instantaneous demand which is required for an individual SKU, compared to the rate at which the operator 41 can depalletize, the sloped gravity conveyor 62 acts as a buffer to ensure that the system 10 does not run out of product. The sloped gravity conveyor 62 is a steep, twisted, high-speed controlled gravity accumulation conveyor in which cases of product traveling from the hingeable conveyor 58 to the mixing conveyor 16 pass through two accumulating gravity curves 74, 76 located in the parallel accumulation lanes 68, 68. The sloped gravity curve 62 sloped downwardly towards the mixing conveyor 16, which is planar. Although two gravity curves 74, 76 are illustrated, one skilled in the art will understand that although two gravity curves 74, 76 are illustrated, the upper gravity curve 74 can be removed leaving only one gravity curve 76 located at the lower end of the sloped gravity conveyor 62, without deviating from the scope of the present invention. The travel speed of the cases of product 40 is limited by series of speed controllers 79 connected to the accumulation lanes 66, 68. A brake/metering mechanism 78 is integrated into each of the parallel lanes 66, 68 and includes an actuatable friction pad 69, which applies friction to the underside of the rollers of the accumulation lanes 66, 68 to stop them from rolling. Boxes, which may be traveling down the sloped conveyor 62, will stop on the stopped rollers. The brake mechanism holds back accumulating product and meters the product into a merging area 80 when the brake mechanism is released. The curve 76 leads the boxes towards a downstream stopper mechanism 82, which ensures that no boxes pass therethrough onto a movable chute 84 when they are not expected and thereby acts as a safety device. The chute 84 is lowered just in time to allow the box to merge onto the mixing conveyor 16. The movable chute 84, as illustrated, operates as a lowerable guide, which lowers to allow the boxes to merge onto the mixing conveyor 16.

The two case guides 70, 72 of the mixing conveyor 16 allow precise product tracking on either of the guides 70, 72. Products coming off the end of the guides 70, 72 are in the correct sequence to be palletized into a customer order on a pallet.

Referring now to FIG. 1, the case switch 18 is connected to the ends of the case guides 70, 72 and diverts the selected products 40 exiting the guides 70, 72 towards the appropriate palletizer 20, which is expecting that specific sequence of products and which creates pallet loads composed of different products on the same pallet. Another conveyor system 88 is connected downstream of the case switch 18 and receives sequences of products, which are transferred to one of three palletizers 20a, 20b, 20c, according to a predetermined schedule. In the embodiment illustrated three motorized conveyors 90, 92, 94 are illustrated feeding three palletizers 20. One skilled in the art will recognize that one or more belts and one or more palletizers may be used without deviating from the scope of the invention. The palletizing stations 20a, 20b, 20c create layers of products, which are deposited either onto empty pallets 38, or on top of partially loaded pallets (batches). Empty pallets 38 exit from pallet magazines 96 and partial loads are accumulated on a batch infeed conveyor 98 and finished pallets 101 exit on an outfeed conveyor 100.

Referring now to FIG. 1, at each palletizer station 20, batching operators (not shown) generate partial loads using equipment (not shown) and place a pallet that has already had one or more complete layers, (batches), on the batch infeed conveyor 98. The batching section 15 relieves the depalletizing station 12 operators from having to remove complete layers of cases, only to have these complete layers rebuilt at the palletizer stations. The batching operators load one complete layer at a time onto the pallet at a rate that is similar to depalletizing and repalletizing. As a result, incorporating the batching section 15 increases the overall capacity of the system 10. Once a batched pallet has been prepared, it is placed on the accumulating batch infeed conveyor 98 that feeds the palletizer station 20. The palletizer palletizes additional pieces on top of the batched layer(s). The pallet 38 is then conveyed on the accumulating outfeed conveyor 100 where the picking drivers retrieve it.

Once a new truckload has been added to the truckload queue, it is automatically scheduled to be processed. Scheduling involves several distinct operations, in which the pallets are sequenced for processing.

Once the batched SKUs have been identified and assigned to the batching section, all remaining SKUs of the pallet that correspond to the 16 high and normal mover SKUs are assigned to the mixing section. These SKUs are released onto the mixing conveyor in the correct sequence and quantity so that they conform to certain precise layer patterns. These patterns are predetermined ensure the stability of the completed pallet.

Each of the two depalletizing lines with their associated mixing conveyors process separate truckloads: the same truckload will not appear on both conveyors. This independence between the two lines prevents problems in the event of a shutdown of one of the lines.

OPERATION

Referring now to FIGS. 1 and 3, a typical operation of the system 10 of the present invention will now be described.

At the semi-automated depalletizing stations 20, the operator 41 begins to depalletize each product (SKU) and continually replenishes the separate first case guides 56, 58. From this point onwards, the system is fully automated and operates at high speed. Each case guide 56, 58 feeds into the mixing conveyor 16, where each product 40 is then metered or merged to produce a mix of products on the mixing conveyor 16. This mix corresponds to the specific customer order. The mixing conveyor 16 transports its sequence of cases to the case switch 18 and the motorized conveyor system 88, which can feed two or more palletizers 20. Each palletizer 20 may be designed to receive a series of cases with "different footprints", such as different lengths and widths. The palletizers 20 can handle different types of pallets, and can accept batched pallets. Batched pallets are those which have been previously prepared, and include one or more complete layers of cases of the same SKU. These batched pallets are prepared using lift trucks (not shown) with specialized equipment that extract a complete layer of cases at a time. The output pallet conveyor of each palletizer 20 includes individual pallets, which are retrieved by slow mover section picking drivers. The picking drivers pick the remaining cases and place them on the pallet 20.

While a specific embodiment has been described, those skilled in the art will recognize many alterations that could be made within the spirit of the invention, which is defined solely according to the following claims.

We claim:
1. An order merging system, the system comprising:
at least two depalletizing stations, each depalletizing station being dedicated to a different respective product unit depalletized thereon;
for each depalletizing station, at least one pair of first case guides in communication therewith and having at least one pair of curved, twisted and downwardly sloping lanes for guiding at least one product case of the respective product unit for the depalletizing station therealong in each of the first case guides;
for each pair of first case guides, at least one pair of lowerable guides connected downstream thereof and in respective communication therewith;
at least one pair of independent mixing second case guides of a mixing conveyor for receiving mixed product cases thereon to feed the cases away from the at least two depalletizing stations and located downstream therefrom, each said lowerable guide being selectively in communication with a respective one of said second case guides, the lowerable guides being selectively lowerable to allow the product cases of the respective product unit for the depalletizing stations from each said first case guide to merge onto a respective said second case guide, each said depalletizing station being at a respective location along the mixing second case guides such that one of the at least two depalletizing stations is downstream of the other one relative to the mixing second case guides, each said lowerable guide of a downstream said depalletizing station, when in a raised position, allowing mixed product cases merged onto respective said second case guide from an upstream said depalletizing station to flow thereunder.

2. The system, according to claim 1, includes:
for each depalletizing station, at least one accumulating conveyor system connected thereto, each accumulating conveyor system being dedicated to the respective product unit for the depalletizing station connected thereto, each accumulating conveyor system including the at least one pair of the first case guides, each of the first case guides receiving at least one case of the respective product unit for the depalletizing station.

3. The system, according to claim 2, in which the accumulating conveyor system includes a conveyor end portion and a sloped gravity conveyor, the first case guides running from the conveyor end portion to the mixing conveyor via the sloped gravity conveyor.

4. The system, according to claim 3, in which the conveyor end portion and the sloped gravity conveyor each includes a pair of independent product accumulation lanes.

5. The system, according to claim 4, in which the conveyor end portion is a hingeable conveyor hingeably connected to the sloped gravity conveyor, the hingeable conveyor being movable laterally relative to the sloped gravity conveyor.

6. The system, according to claim 5, in which a flexible joint connects the hingeable conveyor to the sloped gravity conveyor.

7. The system, according to claim 6, in which a flip-up bridge is connected to the hingeable conveyor.

8. The system, according to claim 7, in which the sloped gravity conveyor includes at least one gravity curve.

9. The system, according to claim 8, in which the sloped gravity conveyor includes two gravity curves.

10. The system, according to claim 9, in which the sloped gravity conveyor further includes a plurality of speed controllers connected to the parallel product accumulation lanes.

11. The system, according to claim 10, in which each of the product accumulation lanes includes a brake/metering mechanism actuatable thereagainst to frictionally engage the accumulation lanes for stopping the product cases located thereon.

12. The system, according to claim 11, in which the sloped gravity conveyor further includes the lowerable guides, each lowerable guide being a movable chute located downstream from the gravity curves.

13. The system, according to claim 1, in which a case switch is connected to the mixing lanes.

14. The system, according to claim 13, in which a motorized conveyor system is connected to the case switch.

15. The system, according to claim 14, in which the motorized conveyor system includes three conveyors.

16. The system, according to claim 15, in which three palletizing stations are connected to the three conveyors.

17. The system, according to claim 1, in which each said depalletizing station includes a main support frame having a mezzanine level with a lift access opening therein, the lift access opening being sized and shaped to receive therethrough a pallet having thereon the product case.

18. The system according to claim 17, in which each said depalletizing station further includes a pallet hold/empty pallet eject mechanism connected to the mezzanine level.

19. The system, according to claim 17, in which each said depalletizing station further includes a pallet infeed conveyor having thereon a full pallet of the product case.

20. The system, according to claim 17, in which each said depalletizing station further includes a stationary lift to raise the full pallet to the mezzanine level.

21. The system, according to claim 1, includes sixteen depalletizer stations.

* * * * *